Patented Aug. 10, 1954

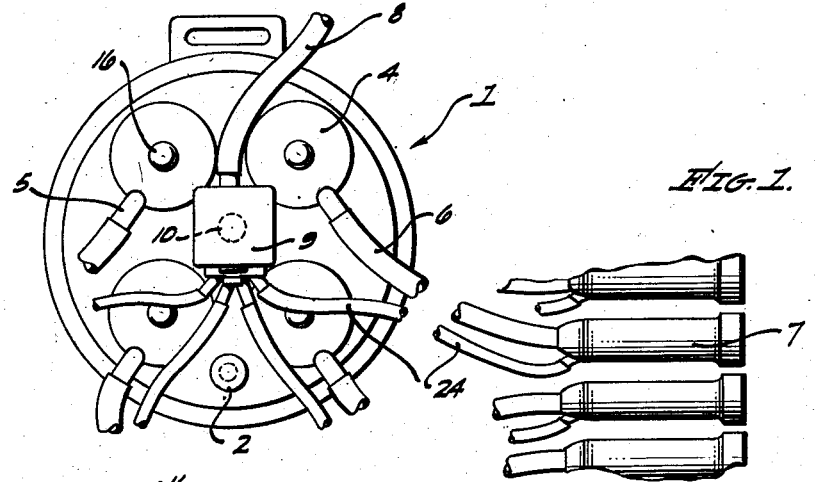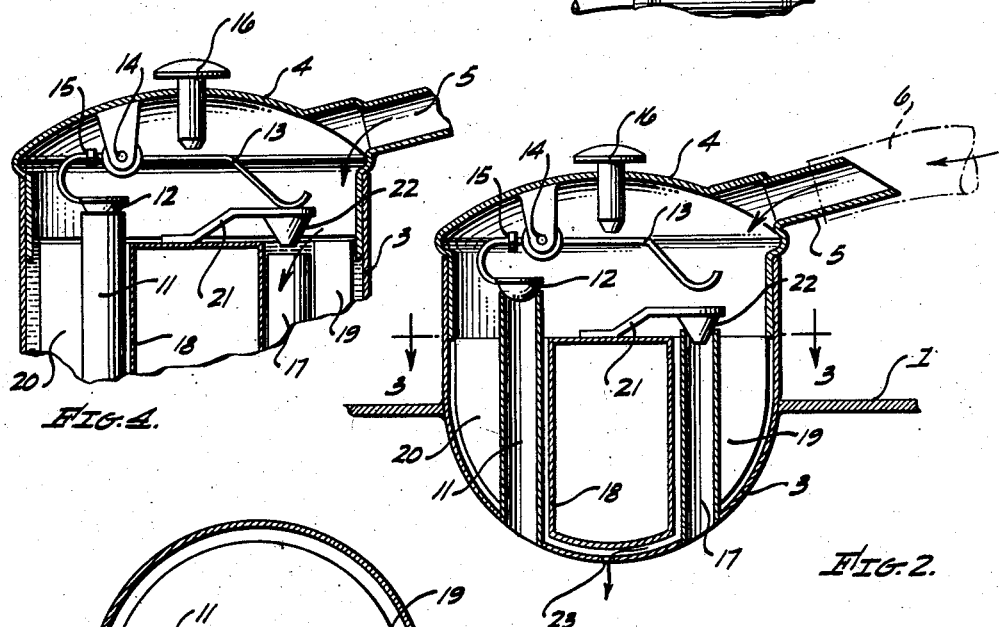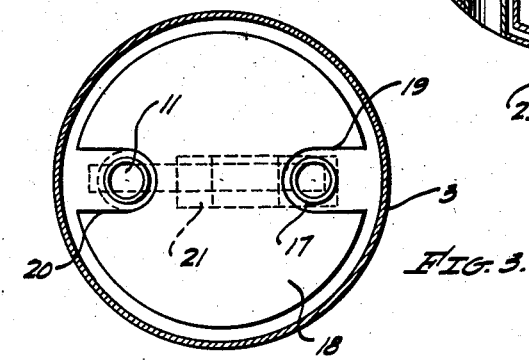

2,685,862

UNITED STATES PATENT OFFICE 2,685,862

AUTOMATICALLY CONTROLLED VALVE ASSEMBLY FOR MILKING MACHINES

Artie Ray Hill and John E. Jones,
Long Beach, Calif.

Application December 1, 1952, Serial No. 323,443

4 Claims. (Cl. 119—14.08)

This invention relates to an improvement for automatic valve assemblies of milking machines, that is, the valve assembly which is mounted on a milk can and through which the milk passes from the cow's udder to this can.

An object of our invention is to provide a novel automatically controlled valve assembly for milking machines in which the vacuum to the teat cups is automatically cut off as soon as the flow of milk to the various units of the valve assembly stops. It is very important that the milking operation be stopped as soon as the milk stops to flow from the cow in order that the cow may not be seriously injured, due to the continued suction on the udder caused by the milking machine. Continued suction on a cow's udder will cause the rupture of certain blood vessels which destroys her usefulness as a milk cow.

Another object of our invention is to provide a novel means whereby the various elements of the automatic valve assembly may be started to function, that is, a means whereby a tube may be opened to the source of vacuum, thereby causing a suction to be exerted on a teat cup.

Another object of our invention is to provide a novel means whereby the vacuum will be automatically shut off to the teat cup as soon as the flow of milk to a receptacle of the valve assembly is stopped.

Other objects, advantages and features of invention may appear from the accompanying drawing, the subjoined detailed description and the appended claims.

In the drawing:

Figure 1 is a top plan view of our automatically controlled valve assembly for milking machines.

Figure 2 is an enlarged transverse sectional view of one of the receptacles in the valve assembly.

Figure 3 is a sectional view taken on 3—3 of Figure 2.

Figure 4 is an enlarged fragmentary transverse sectional view of one of the receptacles showing the one valve in open position.

Referring more particularly to the drawing, the numeral 1 indicates a lid which is placed on a large container or can in which the milk is received. The lid fits tightly on the top of this can so that there is no appreciable leakage between the lid and the can, all of which is usual and well known in the art. A relief or vent 2 on the lid can be manually depressed for the purpose of relieving the vacuum within the large can or container when it is desired to remove the lid from the can. Mounted on the lid 1 are a number of receptacles 3. There are preferably four of these receptacles and each of them are fixedly mounted in the lid 1 and project through this lid, as shown in Figure 2. A cap 4 fits tightly on each of the receptacles 3 and closes the top thereof. Each of the caps 4 is provided with an intake tube 5 to which a hose or tube 6 is attached, and each hose extends to a teat cup 7, again all of which is usual and well known in the art.

A constant vacuum is drawn on the milk can through a hose 8 which extends from a vacuum pump (not shown) to a fitting 9 which is mounted on the lid 1, and preferably upon a tube 10 which extends through the top of the lid and enables the vacuum pump to evacuate the milk can. As thus far described, it will be evident that the milk can will be maintained under a partial vacuum, which means that the space below the lid 1 is evacuated.

A small control pipe 11 extends through the bottom of each receptacle 3 and rises vertically within the receptacle. A valve 12 closes the top of the control pipe 11 in one position of the valve. The valve is mounted on an arm 13 pivoted to the cap 4 at 14. A counter-weight 15 on the arm 13 normally tends to swing the valve 12 downwardly into engagement with the top of the control pipe 11. A push button 16 in each of the caps 4 is slidably mounted in the caps and when pushed downwardly engages the arm 13 and swings this arm so as to raise the valve 12 and permit a vacuum to be drawn through the pipe 11 when starting the milking procedure, as will be more fully described.

A flow pipe 17 also extends through the bottom of each receptacle 3 and rises vertically within the receptacle. A float 18 is mounted in each of the receptacles 3 and these floats are cut out on each side as shown at 19 and 20 so as to not interfere with the pipes 11 and 17. These cut outs also act as guides for the float and enable the float to move accurately in a vertical plane as milk enters the receptacle. The floats 18 are each provided with a finger 21 which carries a valve 22 engageable with the top of the flow pipe 17. Thus when the float 18 drops in the receptacle 3 the valve 22 will engage and close the top of the flow pipe 17 and thus stop the movement of air therethrough. A small drain port 23 is provided in the bottom of each of the receptacles 3 through which milk can drain at a slow rate and during the time that a very small amount of milk is flowing into each receptacle.

In operation the vacuum pump is started after the lid 1 has been securely mounted on the top of the milk can. The vacuum pump will partially evacuate the milk can, all of which is self evident. The teat cups 7 are now placed in position and as each cup is placed on the cow's teat the button 16 will be depressed. This causes the arm 13 to be swung downwardly raising the valve 12 and permitting vacuum to be drawn through the control pipe 11. This vacuum then is exerted through the tubes or pipes 6 to the cup 7 and the milking operation will start.

As soon as milk starts to flow into each receptacle 3 the float 18 will rise and this moves the valve 22 upwardly to uncover the top of the flow pipe 17. As the float 18 rises, it will engage the arm 13 to seat the valve 12 on top of the control pipe 11. During the milking, therefore, vacuum will be drawn through the flow pipe 17. The milk continues to rise in the receptacles 3 while it flows into the top of the flow pipe 17 and thence into the milk can. This operation continues while the flow of milk through the tube 6 is reduced to such an extent that the float 18 will drop in the receptacle. The milk continues to flow outwardly through the port 23 and as the float 18 reaches approximately the bottom of the receptacle 3, it will close the flow pipe 17 by seating the valve 22, thus shutting off the vacuum to the teat cup 7, and thereafter air pressure from the pressure hose 24 will release the teat cup and permit it to drop off of the cow's teat. The remaining milk in the receptacle 3 will all drain out through the port 23 into the milk can.

It will be understood that each of the receptacles 3 will be started by depressing the control button 16 in the manner described above. The control pipe 11 is also somewhat longer than the flow pipe 17 and, consequently, milk will flow through the pipe 17 instead of the control pipe 11 and, furthermore, the control pipe is closed shortly after the milking operation starts while the flow pipe 17 is open, due to the upward movement of the float, as described above.

Having described our invention, we claim:

1. An automatic lid for milking machines adapted to be mounted on a milk bucket comprising, means on the lid attachable to a vacuum source, a receptacle mounted on said lid, a teat cup, a tube extending from the receptacle to the teat cup, a flow pipe in said receptacle extending through the bottom of said receptacle and open at the top, a float in said receptacle, valve means on said float engageable with said flow pipe to close said flow pipe in one position of the float, a control pipe in said receptacle, a second valve means engaging and closing the control pipe in one position of the valve means, and manual means engaging the second valve means to unseat the same and open the control pipe.

2. An automatic lid for milking machines adapted to be mounted on a milk bucket comprising, means on the lid attachable to a vacuum source, a receptacle mounted on said lid, a teat cup, a tube extending from the receptacle to the teat cup, a flow pipe in said receptacle extending through the bottom of said receptacle and open at the top, a float in said receptacle, valve means on said float engageable with said flow pipe to close said flow pipe in one position of the float, a control pipe in said receptacle, a second valve means engaging and closing the control pipe in one position of the valve means, and manual means engaging the second valve means to unseat the same and open the control pipe, said receptacle having a bleed hole in the bottom thereof, said bleed hole opening into the milk bucket.

3. An automatic lid for milking machines adapted to be mounted on a milk bucket comprising, means on the lid attachable to a vacuum source, a receptacle mounted on said lid, a teat cup, a tube extending from the receptacle to the teat cup, a pipe in said receptacle extending through the bottom of said receptacle and open at the top, a float in said receptacle, a finger on said float, a valve on said finger, said valve being engageable with the top of said pipe to close said pipe in one position of the float, a control pipe in said receptacle, an arm pivotally mounted in the receptacle, a valve on the end of said arm engageable with the top of the control pipe to close the same in one position of the arm, a push button extending into the receptacle and engageable with said arm to swing said arm on its pivot and disengage the valve thereon with the control pipe.

4. An automatic lid for milking machines adapted to be mounted on a milk bucket comprising, means on the lid attachable to a vacuum source, a plurality of receptacles mounted on said lid, a cap removably mounted on each of the receptacles and closing the top thereof, teat cups, a tube extending from each of said caps to one of the teat cups, a vertical flow pipe in each of said receptacles, said pipes extending through the bottom of said receptacles and open at the top, a float in said receptacle, a finger on the float, a valve on said finger engageable with the flow pipe to close the same in one position of the float, a control pipe in each of the receptacles, said control pipes extending through the bottom of said receptacles and open at the top, an arm, means pivotally mounting the arm on each of the caps, a valve on the arm engageable with the top of the control pipe to close the same in one position of the arm, and a push button extending through each of the caps and engageable with said arm to swing said arm on its pivot and disengage the valve thereon from the control pipe.

References Cited in the file of this patent

UNITED STATES PATENTS

| Number | Name | Date |
| --- | --- | --- |
| 854,643 | Hartnett et al. | May 21, 1907 |
| 998,856 | Mitchell | July 25, 1911 |
| 1,109,800 | Sorensen | Sept. 8, 1914 |
| 1,193,402 | Laughlin | Aug. 1, 1916 |
| 1,276,803 | Paarmann | Aug. 27, 1918 |
| 2,445,904 | Bloemers | July 27, 1948 |
| 2,466,841 | Eades | Apr. 12, 1949 |